United States Patent
Busby et al.

(10) Patent No.: US 10,632,686 B2
(45) Date of Patent: *Apr. 28, 2020

(54) POLYUREA PERIMETER SEAL FOR AN AIRCRAFT ANTENNA OR OTHER AIRCRAFT PART

(71) Applicant: THE PATENT WELL, LLC, Fort Worth, TX (US)

(72) Inventors: Jeff Busby, Millsap, TX (US); Chad Knight, Dodd City, TX (US); Kent Boomer, Aledo, TX (US); Michael Dry, Fort Worth, TX (US); Matt Boyd, Fort Worth, TX (US)

(73) Assignee: The Patent Well LLC, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/107,084

(22) Filed: Aug. 21, 2018

(65) Prior Publication Data

US 2018/0354200 A1 Dec. 13, 2018

Related U.S. Application Data

(63) Continuation of application No. 15/683,219, filed on Aug. 22, 2017, now Pat. No. 10,052,817, which is a continuation-in-part of application No. 14/799,144, filed on Jul. 14, 2015, now Pat. No. 9,765,888.

(60) Provisional application No. 62/024,561, filed on Jul. 15, 2014.

(51) Int. Cl.
*F16J 15/12* (2006.01)
*B29C 65/48* (2006.01)
*B64C 1/36* (2006.01)
*F16J 15/10* (2006.01)
*F16J 15/14* (2006.01)
*F16J 15/06* (2006.01)
*B64F 5/00* (2017.01)
*B29K 105/00* (2006.01)
*H01Q 1/28* (2006.01)

(52) U.S. Cl.
CPC ............ *B29C 65/4805* (2013.01); *B64C 1/36* (2013.01); *B64F 5/00* (2013.01); *F16J 15/065* (2013.01); *F16J 15/102* (2013.01); *F16J 15/108* (2013.01); *F16J 15/14* (2013.01); *B29K 2105/0026* (2013.01); *C08G 2190/00* (2013.01); *H01Q 1/28* (2013.01)

(58) Field of Classification Search
CPC .................................. F16J 15/14; B64C 1/36
See application file for complete search history.

(56) References Cited

U.S. PATENT DOCUMENTS

| | | |
|---|---|---|
| 5,534,295 A | 7/1996 | Schlichter et al. |
| 7,879,955 B2 | 2/2011 | Rao et al. |
| 7,915,371 B2 | 3/2011 | Byrd et al. |
| 8,759,692 B2 | 6/2014 | Bunyan et al. |
| 2004/0070156 A1 | 4/2004 | Smith |

(Continued)

*Primary Examiner* — Gilbert Y Lee
(74) *Attorney, Agent, or Firm* — Jackson Walker LLP

(57) ABSTRACT

A sealant is provided for use on an aircraft or other vehicle. The sealant may be used with a gasket. The sealant is a perimeter seal that comprises a polyurea member. The polyurea member is a self-curing, two-component mix. It may cure to a hardness in the range of about 40 to 100 (Shore A). It may maintain an adequate peel strength to withstand multiple thermal and pressure cycling, and may have a working life, wherein it may be shaped, of less than about eleven minutes.

18 Claims, 4 Drawing Sheets

(56) References Cited

U.S. PATENT DOCUMENTS

2013/0062468 A1    3/2013   Yokoi
2013/0273342 A1   10/2013   Johnson et al.
2014/0015204 A1    1/2014   Boyd et al.
2014/0167367 A1    6/2014   Busby et al.
2014/0334868 A1   11/2014   Apfel

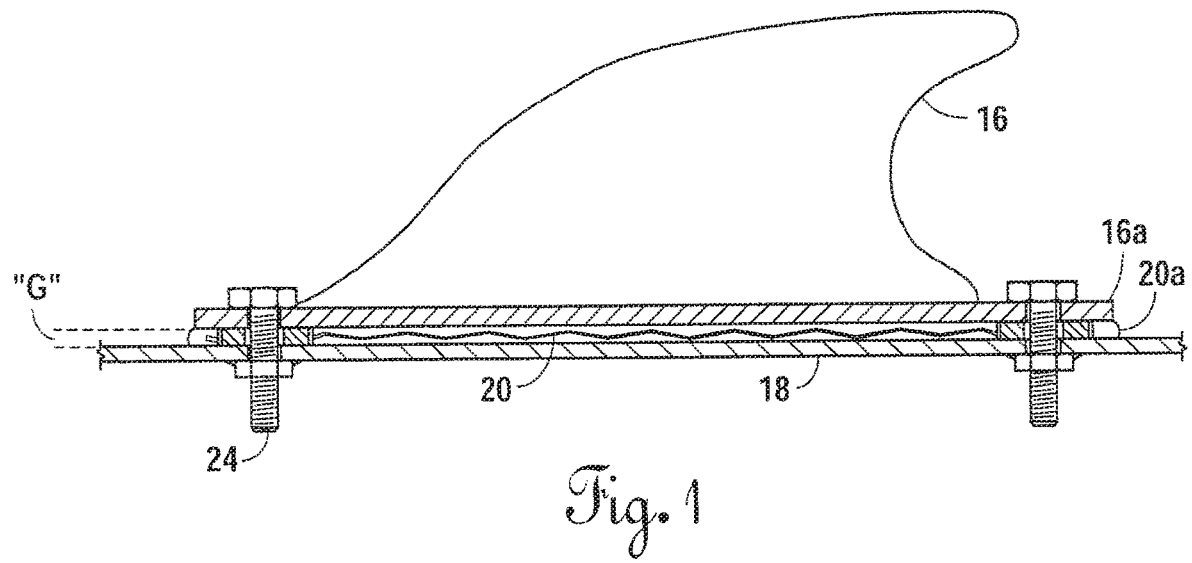
Fig. 1
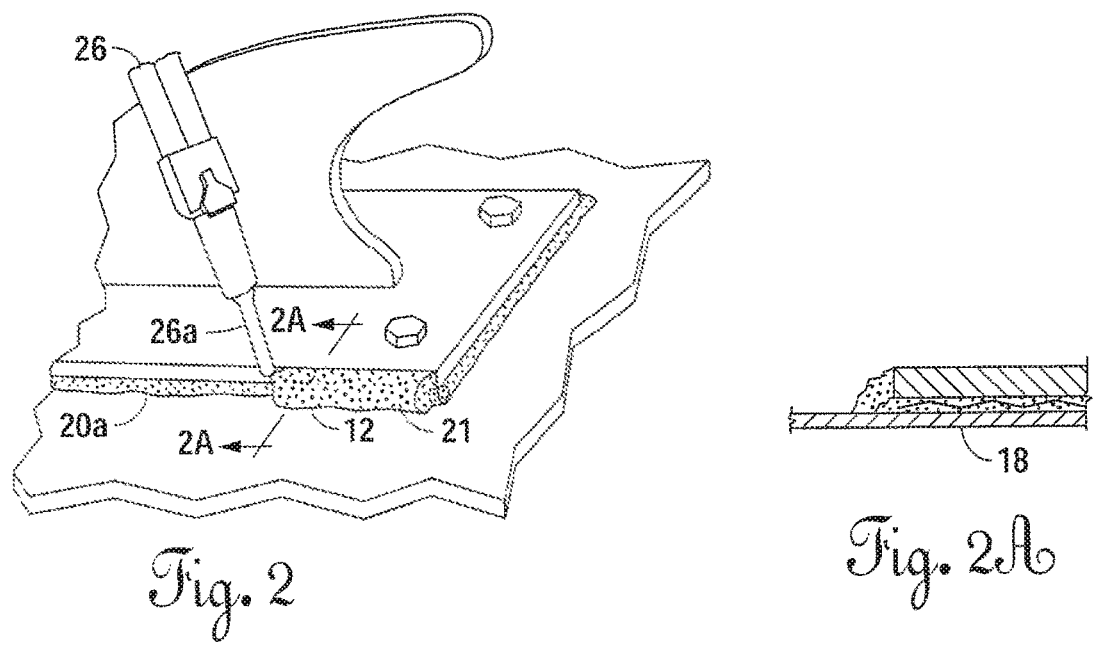
Fig. 2
Fig. 2A

POLYUREA PERIMETER SEAL FOR AN AIRCRAFT ANTENNA OR OTHER AIRCRAFT PART

RELATED APPLICATIONS

This application is a continuation of U.S. patent application Ser. No. 15/683,219, filed Aug. 22, 2017, which is a continuation-in-part application of U.S. patent application Ser. No. 14/799,144, filed Jul. 14, 2015, which claims the benefit of U.S. Patent Application No. 62/024,561, filed Jul. 15, 2014. These prior are applications are herein incorporated by reference in their entirety.

FIELD OF THE INVENTION

A seal and a method for sealing for a perimeter of an aircraft or marine vehicle workpiece or part which, in one example, may be an aircraft antenna, which is bolted to an aircraft base, which may be a fuselage. A pliable polyurethane gasket or other gasket may be under compression between the aircraft part (workpiece) and base, for example, a fuselage of an aircraft. To this or other vehicle parts combination, a polyurea perimeter seal may be applied.

BACKGROUND OF THE INVENTION

Aircraft parts are typically fastened to aircraft structure or base with fasteners. Often gaskets, including pliable, sticky polyurethane gaskets, such as those found in U.S. Pat. Nos. 6,530,577; 6,695,320; and 7,229,516, incorporated herein by reference are used. During compression of the gasket as the workpiece is fastened down with torque applied to fasteners, there is sometimes squeeze out laterally at or near a perimeter edge of the gasket. Sometimes the perimeter edge of the gasket generally conforms in shape to the perimeter of the part that is being fastened to the base. However, once the workpiece is fastened, there is sometimes further squeeze out or sometimes there is actually an indentation where there was not sufficient gasket material (in an undercut gasket) to carry out to the edge of the perimeter of the workpiece, leaving the indentation. Sometimes the tightening or torque down on the fasteners, which generates squeeze out of a pliable gasket body, brings the deformable gasket body right up to the workpiece perimeter, but usually squeeze out extends beyond the perimeter.

It may be advantageous, for aesthetic and functional reasons (as in providing a good environmental seal and limiting squeeze out), to provide a perimeter seal, that may be shaped, that contacts and surrounds substantially all of the perimeter of the part, the gasket body that may or may not have been squeezed out past the perimeter of the part or the workpiece, and the base upon which the workpiece is to be fastened.

SUMMARY OF THE INVENTION

In one particular embodiment, a perimeter seal is a two component polyurea and the gasket under compression is cured polyurethane gel. In this particular embodiment, the polyurea perimeter seal may be pliable and sticky polyurea (in uncured condition) that is allowed to cure after the two components are mixed and applied with an applicator that mixes the two components while it flows the perimeter mix out a nozzle onto the perimeter. One such applicator is Part UG981108-01 available from Aviation Devices & Electronic Components, L.L.C., 3215 W Loop 820 S, Fort Worth, Tex. 76116. A suitable two-part polyurea is part no. TG3212 from KBS, Fort Worth, Tex.

In another embodiment, the perimeter seal is two-component polyurea material with the two components being an isocyanate prepolymer component and a resin blend, such as a polyamine, with amine terminated members. The polyurea is applied with an applicator that has a body for each component and a double compartment syringe-like forcing element. The forcing element is pushed by the user's hand while his second hand holds and directs the body of the applicator. The system does not depend upon pressurized gas to dispense the mix. In one embodiment, the isocyanate is a diisocyanate between about 13 and 30% mixed with about 25-45% resin blend or hardener. A mixing tip or mixing nozzle on the applicator allows the two components to mix as they are being applied, typically as a bead, along the workpiece/gasket/fuselage perimeter after the workpiece has been torqued down. After being shaped, the two-component mix will quickly cure in place.

In one embodiment, after application of an uncured polyurea bead, it is manually formed into a concave, convex or shaped profile by either the use of one's hand or a handheld tool. The perimeter, in one embodiment, will cure in a low profile concave, convex or flat shape that will join and spread across a gap along the perimeter edge of the part where it joins the base.

Applicant's two-component polyurea systems are typically silicone and polysulfide free and may have a very rapid cure time achieved without the use of a catalyst as in the two-component polyurethane systems. This rapid cure time is typically very consistent and uniform over a very broad temperature range. The two components are free of VOC's and solvents.

The Polyurea Development Association defines polyurea as follows:

"A polyurea coating/elastomer is that derived from the reaction product of an isocyanate component and a resin blend component. The isocyanate can be aromatic or aliphatic in nature. It can be monomer, polymer, or any variant reaction of isocyanates, quasi-prepolymer or a prepolymer. The prepolymer, or quasi-prepolymer, can be made of an amine-terminated polymer resin, or a hydroxyl-terminated polymer resin. The resin blend must be made up of amine-terminated polymer resins, and/or amine-terminated chain extenders. The amine-terminated polymer resins will not have any intentional hydroxyl moieties. Any hydroxyls are the result of incomplete conversion to the amine-terminated polymer resins. The resin blend may also contain additives, or non-primary components. These additives may contain hydroxyls, such as pre-dispersed pigments in a polyol carrier. Normally, the resin blend will not contain a catalyst(s)."

The two-component polyurea system reaction may take place between a polyisocyanate component and the resin component. The action generates polymerization and curing.

Polyurea technology typically differs from polyurethane, in that amine terminated ($-NH_2$) resins are used rather than hydroxyl terminated ($-OH$) resins commonly referred to as polyols. The reaction of the amine terminated resins with the isocyanate component results in the formation of a polyurea linkage. The resin blend of the two-component polyurea systems may be aliphatic or aromatic.

In one particular embodiment, the two-component cure-in-place polyurea perimeter material has a working life (more viscous than gel, but not too hard, for shaping) of less than about four minutes, and a gel time (too hard to shape, but still deformable) of more than about four minutes (preferably between 4 and 8 minutes), and a full cure (substantially complete hardening) of less than about two hours at room temperature (about 24° C. to 26° C.). In another embodiment, the working life of the two-component mix is about 2-4 minutes after leaving the mix nozzle at about room temperature. In another embodiment, the working life is up to about 11 minutes; in another embodiment, up to about 7 minutes; and in another embodiment, up to about 4 minutes from the time it is mixed and applied. At the end of the working life, the mix starts to gel, and will gel in about one to two minutes. Substantially full cure is typically about an hour, allowing the parts to return to service quickly. The working life may be at room temperature or temperatures between about 15° C. and 40° C. In a preferred embodiment, the perimeter seal has a two-component polyurea mix that has a UV inhibiting agent, such as carbon black, that renders it substantially black in color and improves UV resistance, a hardness after full cure between about 70 to 90 (shore A at 25° C.), and a peel strength of greater than about 25 pounds/inch width, in another embodiment, peel strength from about 10 to 40 pounds per inch width.

In one embodiment, the invention may include an assembly comprising an aircraft base and an aircraft workpiece having an outer perimeter and optionally a polyurethane gasket (or other elastomeric gasket) under compression between the two. The gasket has an outer perimeter. A perimeter seal around the outer perimeter has, in one embodiment, a substantially continuous linear polyurea member (complete or partly encircling the workpiece) of cure in place polyurea. The perimeter seal typically contacts the base, the workpiece, and the body of the gasket if a gasket is used.

A "seal" or "sealant" means any composition that can be used to form a connecting bond between two or more objects, articles or bodies or to fill at least a portion of any type of opening, junction or other space in, on or between one or more objects, articles or bodies (e.g., grooves, pits, cracks, joints, spaces between adjacent or overlapping members, pores, rivet holes and seams). Some sealants are used, for example, to fill a space defined by two or more overlapping or adjacent members of a structure, such as a joint around a window, a joint connecting or between parts of an aircraft or watercraft. In some embodiments, for example, sealants can be used to smooth a surface or to act as a caulk-like material to slow or stop movement of moisture, chemicals, gasses, debris, and other materials through or across an opening, junction or space, although the foregoing functions are not required properties of the sealant.

Seal or sealant materials may cure (i.e., solidify and harden) upon or after application through chemical or physical behavior of one or more components in the sealant. In some embodiments, the sealant is a self-curing sealant. A "self-curing sealant" is a sealant that cures upon application at room temperature (about 24° C. to 26° C.) or, in another embodiment, between about 15° C. and 40° C., without further administration of heat or irradiation. Some examples include emulsions of one or more polymers (e.g., acrylic polymers) in water or another solvent that cure through physical coalescence upon drying through evaporation; prepolymers that polymerize through reaction with atmospheric moisture or ambient water (e.g., isocyanate-cured polyurethane or polyurea prepolymers); compositions containing two or more compounds that are combined to react with each other to cause the composition to cure (e.g., two-component polyurethane or polyurea sealants); and sealant compounds that react with materials in the substrates to which they are applied to bond to such materials (e.g., silane-terminated sealants having alkoxy groups that react with hydroxyl groups on substrates).

The term "polymer" as used herein means a molecule that is the reaction product of polymerizing at least one type of monomer and, in the case where the polymer includes two or more types of monomers, the monomers may be arranged in any order and polymerized concurrently or sequentially. The polymers of the perimeter seal of the present invention may be a two-component polyurea, the components of which are VOC and solvent-free.

In one embodiment, the invention comprises an assembly comprising an aircraft base and an aircraft workpiece having an outer perimeter with a polyurethane bodied gasket between the base and workpiece, the polyurethane gasket body deformable under compression and with an outer perimeter, the polyurethane gasket under compression. A perimeter seal may comprise a shaped, discontinuous or substantially continuous, linear polyurea member formed from a fast curing two-component cured in place polyurea mix. The perimeter seal may contact the base, the workpiece, and optionally the body of the gasket.

In one embodiment, Applicant provides a method of assembling marine vehicle or aircraft parts, in one embodiment, comprising an aircraft workpiece and an aircraft base, the method comprising the steps of: acquiring an aircraft base and an aircraft workpiece, the workpiece having a workpiece outer perimeter and adapted to engage the aircraft base along opposed mating surfaces; acquiring an applicator having a two-component polyurea and a nozzle for mixing the two components; acquiring a pre-cured, die cut gasket comprising a skeleton and a tacky, soft, viscoelastic polymeric gel body, the gasket having a gasket perimeter that is shaped to conform to the workpiece outer perimeter; placing the gasket between the base and the workpiece; and, fastening the workpiece to the base with the gasket under sufficient compression to cause some lateral (outward) movement of the polymeric gel body such that the perimeter of the gel. "Acquiring" when used in the specification and claims means to come into possession or control of, by any means.

A sealant is disclosed for use on an aircraft having an aircraft base and an aircraft workpiece, with a gasket having a gasket body, the gasket for compression between the aircraft base and the workpiece so as to deform the gasket body. The sealant may comprise: a perimeter seal comprising a linear polyurea member formed from a self-curing two-component mix of cured in place polyurea, the perimeter seal contacting at least the base and the workpiece. The cured polyurea, in one embodiment, has a hardness in the range of about 40 to 100 (Shore A) and a working life of less than about 4 minutes at about 24° C. to 26° C.; and wherein the linear polyurea member is capable of withstanding multiple thermal and pressure cycling while maintaining a peel strength of between about 20 to 40 pounds/inch width in one embodiment.

The perimeter seal may contact an outer perimeter of the gasket.

The gasket may comprise cured polyurethane gel.

The perimeter seal may be substantially continuous about the perimeter of the workpiece.

The linear polyurea member may further include a UV inhibiting component.

The two components before mixing, may have a viscosity of between about 18,000 and 42,000 cps, in one preferred embodiment, between about 500 and 90,000 cps in another.

The perimeter seal may be painted upon curing.

An assembly for use on an aircraft or other vehicle is disclosed, the assembly comprising: an aircraft or other vehicle base and an aircraft or other vehicle workpiece having an outer perimeter; and a perimeter seal comprising a shaped linear polyurea member formed from a self-curing two-component mix of cured in place polyurea, the perimeter seal contacting the base and the workpiece; wherein the cured polyurea has a hardness in the range of about 40 to 100 (Shore A) and a working life of less than about 11 minutes at about 24° C. to 26° C.; and wherein the polyurea member is capable of withstanding multiple thermal and pressure cycling while maintaining a peel strength of between about 10 to 40 pounds/inch width.

A gasket may be placed between the base and the workpiece.

The perimeter seal may contact an outer perimeter of the gasket. The gasket may be comprised of cured polyurethane.

The perimeter seal is typically continuous about the perimeter of the workpiece.

A method of putting together a body assembly comprising a base and a workpiece, the workpiece having a workpiece outer perimeter and adapted to engage the base along opposed mating surfaces, the method comprising the steps of: placing between the base and the workpiece a pre-cured, die cut gasket comprising a skeleton and a tacky, soft visco elastic polymeric gel body, the gasket having a gasket perimeter that is shaped to conform to the workpiece outer perimeter; fastening the workpiece to the base with the gasket under sufficient compression to cause some lateral (outward) movement of the polymeric gel body such that the perimeter of the body, the outer perimeter of the workpiece and the base define a junction; with an applicator having a forcing element and a pair of compartments for containing a self-curing two-component polyurea sealant and a nozzle for mixing the two components, applying a linear bead of the uncured sealant mix from the applicator to the junction such that the junction is at least partly covered, and the mix contacts the base and outer perimeter of the workpiece and contacts and covers the outer perimeter of the gasket; and allowing the mix to cure.

The method of the preceding paragraph wherein the workpiece and base are parts of an aircraft window assembly.

The workpiece and base may be part of an aircraft antenna and an aircraft fuselage. In other embodiments, the workpiece and base are parts of aircraft rib joints, floor boards, cargo bays, and door tracks.

The step of shaping the linear bead prior to curing may be included.

The shape of the shaping step may be one of: concave, convex or linear.

The polymer is selected to cure to a hardness of between about 40 to 100 (Shore A) and a peel strength of between about 10 and about 40 pounds per inch width.

The polymer is selected to have a working life of less than about 4 minutes.

A sealant for use on a body having a base and a workpiece, the sealant comprising: a perimeter seal comprising a linear polyurea member formed from a self-curing two-component mix of cured in place polyurea, the perimeter seal contacting the base and the workpiece; wherein the cured polyurea has a hardness in the range of about 40 to 100 (Shore A) and a working lfie of less than about 4 minutes at about 24° C. to 26° C.; and wherein the polyurea member is capable of withstanding multiple thermal and pressure cycling while maintaining a peel strength of between about 10 to 40 pounds/inch width.

The body may be an aircraft vehicle, a marine vehicle, a spacecraft vehicle and the like, the vehicle subject to temperature and pressure cycling.

The outer perimeter of a workpiece and the base may define a junction. A linear bead of the uncured mix from the applicator may be applied to the junction such that the junction is at least partly covered, and the mix contacts the base and outer perimeter of the workpiece and contacts and substantially covers the outer perimeter of a gasket. The mix may be allowed to cure. The workpiece and base may be, in one embodiment, an aircraft antenna and an aircraft fuselage.

Applicant's method may further include, optionally, the step of shaping the linear bead prior to curing. The shape of the shaping step may be one of: concave, convex or linear.

BRIEF DESCRIPTION OF THE DRAWINGS

FIG. 1 is a cutaway cross-sectional view of an aircraft antenna engaged to an aircraft fuselage with a gasket having a pliable body therebetween, the Figure illustrate a condition of antenna/fuselage/gasket prior to the application of Applicant's perimeter seal.

FIG. 2 illustrates a method of forming a polyurea bead or perimeter seal on the external surface of an aircraft fuselage.

FIG. 2A is a cross-sectional view of the uncured polyurea bead after application and prior to shaping.

DETAILED DESCRIPTION OF THE PREFERRED EMBODIMENTS

Figure 3:
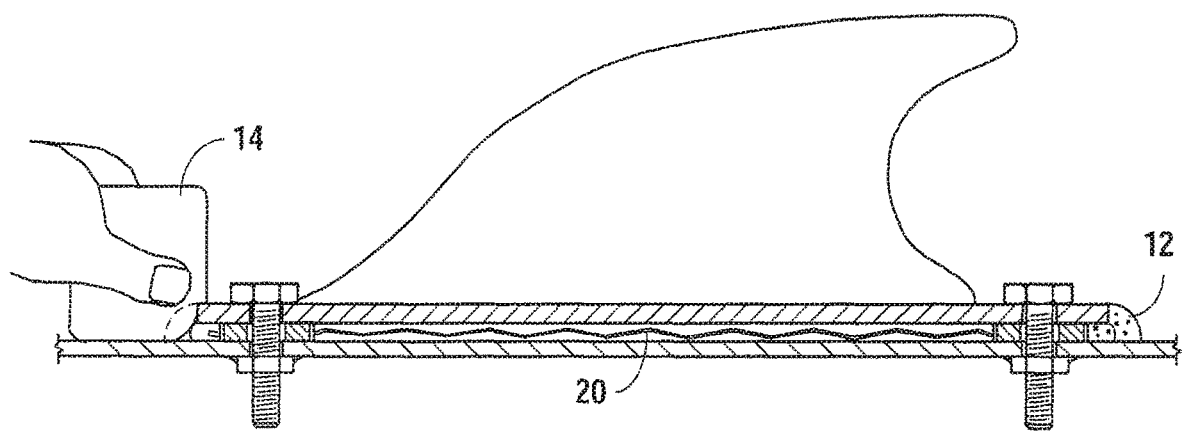
FIG. 3 illustrates the optional shaping step, in cross-section, wherein the uncured polyurea bead is shaped using a shaping tool.

FIGS. 1-4A illustrate an assembly comprising an aircraft base, such as a fuselage 18, and an aircraft workpiece, such as an aircraft antenna 16, having an outer perimeter 16*a* and optionally an elastomeric gasket. In one case, the gasket is a polyurethane gasket 20 having a gasket body of cured polyurethane (such as disclosed in the patents incorporated herein by reference, for example) with an outer perimeter 20*a*. The gasket may be under compression between the base and the workpiece, such as compression generated by a multiplicity of fasteners 24. The figures also illustrate a method of making the assembly and the method of use of the assembly. A kit for use when applying the perimeter seal is also illustrated.

Sometimes the gasket, having a gel, gel-like or pliable body, when compressed, may spread laterally outward at its perimeter 20*a* as the workpiece is being torqued down towards the base. Upon compression, perimeter 20a of the gasket body may reach or not reach (undercut), or extend beyond, the perimeter 16a of antenna 16.

Figure 3A:
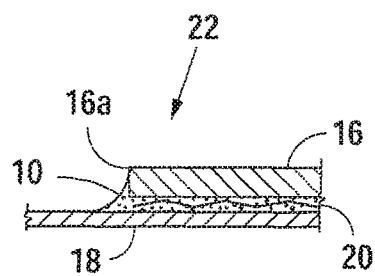
FIGS. 3A, 3B, and 3C illustrate, in cross-sectional view, the profile of the cured polyurea bead on an aircraft workpiece with a gasket between the workpiece and the base.

In one embodiment, Applicant provides a shaped polyurea perimeter seal 10, the shaped perimeter seal created by applying a mixed, uncured (when applied) fast-curing polyurea rope, bead or linear member from an applicator 26 having a mixing nozzle 26a thereon. The uncured mix is typically applied to the perimeter 16a of the workpiece in such a fashion that the uncured polyurea will contact and cure while in contact with perimeter 20a of gasket 20 (if one is present), perimeter 16a of antenna 16 (or other workpiece) and the fuselage 18 or base upon which the workpiece is attached. In this application, the uncured polyurea will both form and (optionally) be shaped before curing "in place" and then cure in place as shaped. In one embodiment, the bead mix 12 (unshaped) will conform to the shape it takes coming out of the nozzle and contacting the three parts (gasket, if used, workpiece, base) when applied and, in another embodiment, the perimeter seal will be shaped 10 prior to curing, such as with a shaping tool 14 (compare FIG. 2 to FIG. 3A) or manually.

In one embodiment, the perimeter seal may be formed and cured in place as a linear member, such as that coming out of nozzle of the applicator as the applicator is moved with the tip of the nozzle just adjacent the workpiece/base perimeter joint. In one particular embodiment, the two-component form and cure in place polyurea has a working life (during which it can be shaped) of less than about 11 minutes and a full cure time (substantially complete hardness) of less than 2 hours (optimally less than about 1 hour) at room temperature. In a preferred embodiment, the perimeter seal is a polyurea comprised of one part isocyanate and one part resin, the two components forming a polymer with multiple urea links. In one embodiment, the polyurea is substantially opaque, in one embodiment, black with tiny particles of carbon black mixed therein for helping make the mix more ultraviolet tolerant. A hardness after full cure in one embodiment is between about 70 and about 90 (shore A at 25° C.) (about 40 to 100 in another preferred embodiment) with a peel strength of greater than about 25 pounds/inch width or in the range of about 10 to 40. Peel strength was (force normal) measured using a 1" wide, 6" long aluminum "trough" about 0.045" in depth, full of fully cured polyurea and containing an embedded pulling material, and measured with a spring scale or other accurate force measuring device.

A method of making the perimeter seal may comprise a step of placing a gasket having, in part, a polyurethane (or other elastomeric) body and an outer perimeter between an aircraft antenna having an outer perimeter and a fuselage, and providing fasteners to torque down the antenna to the fuselage. The aircraft antenna and the gasket may have a similarly configured outer perimeter and, in the process of clamping or torquing down, there may be some squeeze out laterally of the pliable polyurethane of the gasket body.

Figure 3B:
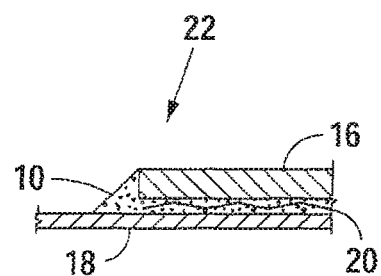
Figure 3C:

An applicator 26 containing a resin blend in one chamber and an isocyanate in another and a mixing nozzle 26a for the mixing of the two components may be used to apply a bead or linear member adjacent the squeeze out in the outer perimeter of the gasket and the workpiece such that, in one embodiment, a linear bead is formed substantially around (surrounding) the outer perimeter of the antenna or other workpiece (see FIG. 2). Typically, the bead contacts the three elements of the assembly and may be shaped (see FIG. 3) before it cures. It may be shaped using a shaping tool 14, which may remove excess uncured perimeter polyurea and provide a shape to the bead, which shape may be flat in one embodiment or slightly concave or slightly convex in other embodiments (see FIGS. 3A, 3B, and 3C).

The shaping tool may have a straight, convex or concave edge, or a combination of these shapes, and may be flexible and made of a rubber or rubber-like material. To help ensure no air gaps at the junction, the flow out of nozzle 26a should be sufficient, in combination with the speed of movement of the applicator, such that the junction preferably be fully coated. The tool can be held at an acute angle to the direction of travel along the bead, with the tool contacting both the base and the workpiece and the bead simultaneously surrounding the workpiece in a preferred embodiment. The shaped perimeter bead may have the following characteristics: it is somewhat flexible (but typically harder than the body of the gasket used), strong, waterproof, easy to install, adhesive to the aluminum and the body of any gasket, eliminates the need for solvents and scraping, and help provides a good environmental seal and effective moisture barrier and is U.V. tolerant.

Figure 4:
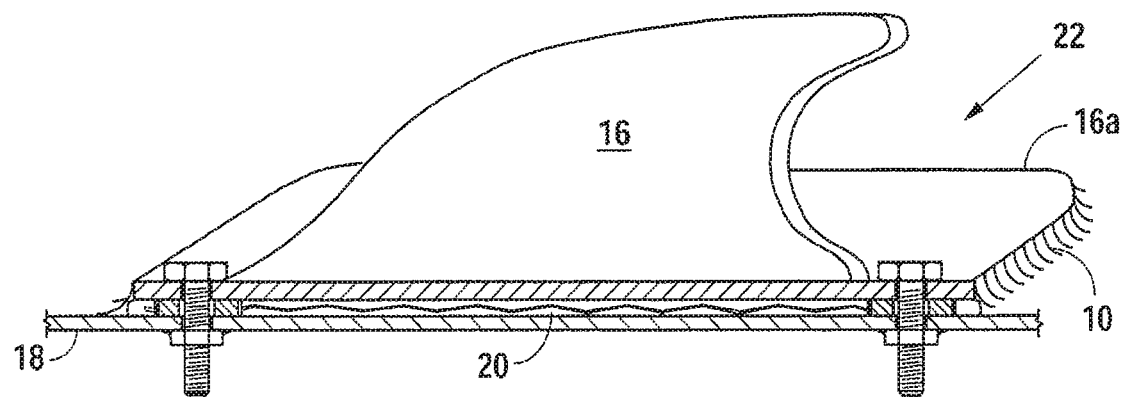
FIG. 4 illustrates an aircraft assembly comprising an aircraft (or other vehicle) workpiece and aircraft base with a gasket between the workpiece and the base and a shaped polyurea bead on the perimeter of the workpiece.
Figure 4A:
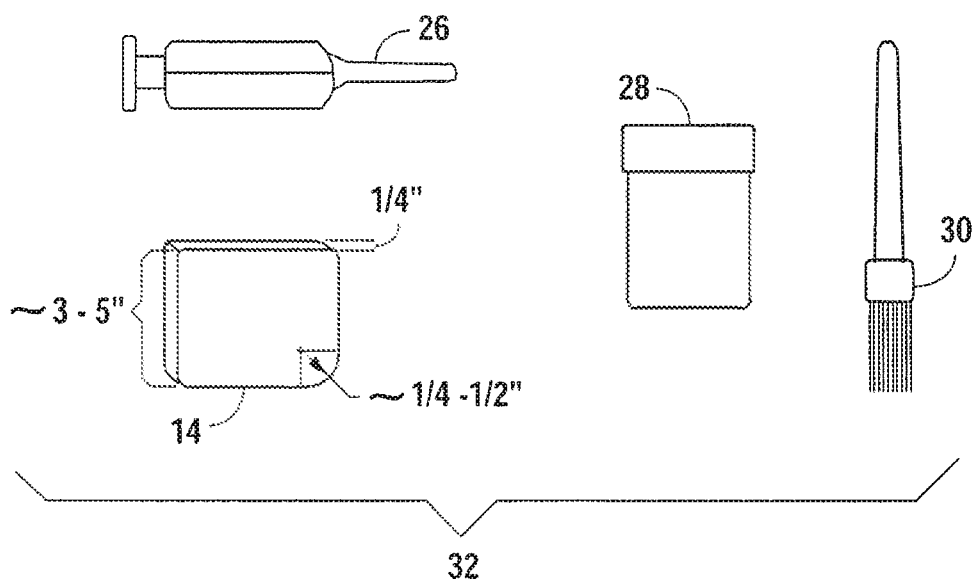
FIG. 4A illustrates a kit for use with applying a perimeter seal to an aircraft workpiece.

FIG. 4A shows a kit 32 for use in making the perimeter seal, the kit with some or all of the following components: applicator 26 (containing the two-part polyurea system), a tabular, flexible, rubber or rubber-like applicator tool 14, which may be rectangular, about 3 to 5 inches along a side with a thickness of about ¼ inch and a curved corner as seen with a curvature of about ¼ to ½ inch, and at about ¼ in another and a curvature less than a ¼ inch at another corner (for sizing the bead during shaping). The tool may be used as illustrated herein to shape the polyurea before it cures. Optionally, a small container of paint 28 may be used along with a brush 30 to paint the perimeter seal following curing. Paint, such as a polyurethane or mil-spec paint, applied to the perimeter seal after it has cured may provide additional environmental and UV protection.

Figure 5:
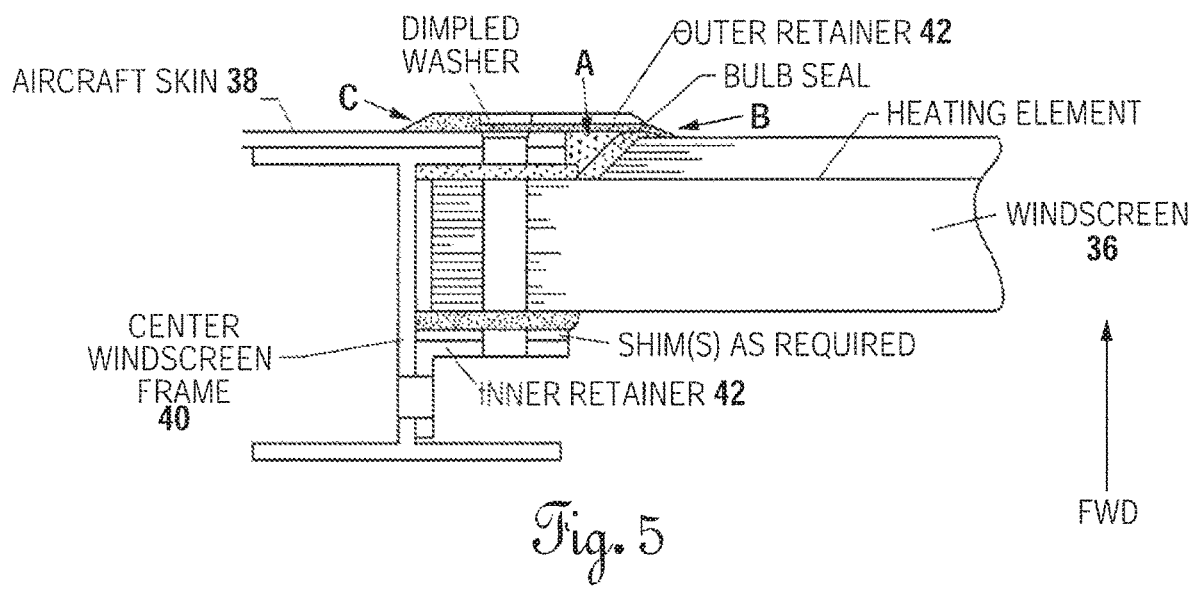
FIG. 5 illustrates the use of polyurea seal with an aircraft window.

FIG. 5 illustrates another environment in which Applicant's polyurea bead or linear member may be used. FIG. 5 illustrates an aircraft window or windscreen 36 attached to an aircraft's skin 38 with a center windscreen frame 40 or other frame structure. An outer retainer 42 may be provided, which engages the aircraft skin and the windscreen frame and the window edge, an inner frame 42 typically holding the aircraft window or windscreen element, the inner frame engaging the outer retainer, the outer retainer also engaging the outer surface of the windscreen as illustrated. Applicant's perimeter seal 10 may be used at any of the places indicated where a durable somewhat flexible environmental seal is provided. Three of these locations are illustrated. "A" shows the use of Applicant's seal between the aircraft skin and inner frame on one side and the window element on the other, with the outer retainer on the outer surface providing an outer boundary to the perimeter seal. The perimeter seal may also be used where the outer retainer meets the aircraft skin or where the outer retainer meets or is adjacent to the outer surface of the windscreen as seen in "C" and "B" above.

The perimeter seal may be used even when there is no gasket between the base and the workpiece. It will provide, in many instances, an effective seal even without a gasket between the base and the workpiece. Moreover, while specific environments are mentioned in the specifications, such as on aircraft, it may be used in any suitable setting where an environmental seal is needed on any assembly. Moreover, it may be halogen-free and silicone-free. Moreover, in a preferred embodiment, no catalyst is required.

Figure 6A:
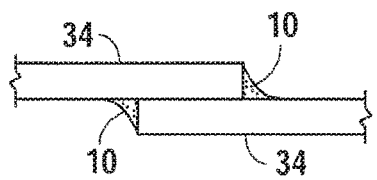
FIGS. 6A, 6B, and 6C illustrate the use of Applicant's perimeter seal on adjacent panels of an aircraft or other vehicle.
Figure 6B:
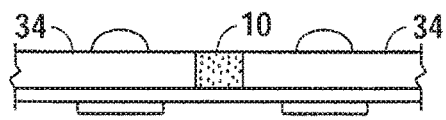
Figure 6C:
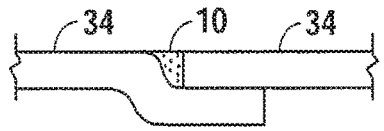

FIGS. 6A, B and C illustrate the use of Applicant's polyurea seal with adjacent panels 34. Panels 34 may be any structural panels on any assembly, but in one embodiment may be aluminum or aluminum alloy panels of an aircraft exterior or interior. For example, FIG. 6A shows to a pair of panels 34 in a lap joint configuration at the exterior lap joint and the interior or inner lap joint where a polyurea bead or perimeter seal 10 may be applied. Note that in this embodiment, as in others, the use of the gasket between the faying surfaces is optional. FIGS. 6B and 6C illustrate the use of Applicant's polyurea seal 10 between the faces of adjacent, but spaced apart, panels 34. Here, as in other locations, Applicant's perimeter seal provides an effective environmental seal protecting the joints from corrosive elements.

Applicants have found that the cure in place polyurea described herein, including the mix having a cure time in the ranges set forth herein and a hardness set forth herein, maintains a good environmental seal over repeated thermal and pressure cycling. An aircraft as it climbs to altitude and descends, undergoes repeated thermal and pressure cycling. It is sometimes difficult to find an easy to apply environmental seal that will maintain its favorable physical characteristics in such a harsh environment. Temperatures may range between about −65° C. and 85° C., and pressures between atmosphere or slightly above (to about 2 atmospheres) down to about 5 inches of mercury. Moreover, a proper seal needs some degree of UV tolerance, as well as tolerance to a variety of humid to dry conditions.

In preferred embodiments of the perimeter seal, both the gasket body and the perimeter are free of polysulfides, chromate, and silicone. The body of the gasket may be a nonconductive gel polymer, including two component polyurethane. The polyurea perimeter seal is typically not a gel and may be used as a pack and gap void seal. It is capable of multiple temperature pressure cycling. In one embodiment, the viscosity of a resin component is between 18,000 and 28,000 cps, 25° C., and the viscosity of a hardener component is about 25,000 to 42,000 cps, 25° C. In one embodiment, the color of the hardener is black through the use of carbon black. Applicant's perimeter seal may be used as a replacement for polysulfide seals wherever the polysulfide perimeter seals are used.

In one embodiment, the polyurea sealant has flame retardant properties. Flame retardant properties mean that the material passes the 15 second vertical burn test, FAR 853A. It may be used as an injectable cure in place and sold as an applicator filled with TG 4317FR Thixoflexblack, Part A and Part B, in the two applicator compartments. When the forcing element of applicator 26 is depressed, the two parts mixed in the nozzle, and may cure in place on a workpiece to form a durable water-tight seal. The thixotropic properties of the thixotropic uncured sealant allow it to be used in vertical or even overhead applications.

In one embodiment, the two parts, the resin and the hardener of the flame retardant polyurea sealant have a viscosity of between about 28,000 and 98,000 cps at 25 C before mixing. Moreover, the gel time is typically less than about 11 minutes and full cure (about 90° or more final hardness) at 77° being about 2 hours or less.

In one embodiment, the peel strength of the flame retardant peel strength is between about 14 and 20 piw. The flame retardant sealant may have a tensile strength of between about 100 and 120 psi. The sealant material may be provided in a non-fire retardant polyurea perimeter, Part No. TG3212, Part A and Part B, in an applicator available from AvDEC, 3215 W. Loop 820, Fort Worth, Tex. 76116. A source of the two parts (resin/hardener) is KBS, Dodge City, Tex.

Although the invention has been described with reference to a specific embodiment, this description is not meant to be construed in a limiting sense. On the contrary, various modifications of the disclosed embodiments will become apparent to those skilled in the art upon reference to the description of the invention. Applicant's various embodiments of its perimeter seal may be used on other devices, such as ships and other marine transport vehicles. It is therefore contemplated that the appended claims will cover such modifications, alternatives, and equivalents that fall within the true spirit and scope of the invention.

The invention claimed is:

1. An assembly for use in applying a seal to an aircraft first part, the assembly comprising:
   an applicator having a forcing element, a first compartment, a second compartment, and a mixing nozzle in fluid communication with the two compartments;
      wherein the first compartment includes a first component and the second compartment a second component, the two components for mixing in the mixing nozzle and capable of curing, to form a polyurea seal; and
      wherein the polyurea seal is thixotropic.

2. The assembly of claim 1, wherein the first component and/or the second component includes carbon black for inhibiting the breakdown of the polyurea seal from ultraviolet radiation.

3. The assembly of claim 1, wherein the working life of the two component mix measured from the time of mixing is less than about 11 minutes at temperature between about 15° C. and 40° C.

4. The assembly of claim 1, wherein each of the two components before mixing, have a viscosity of between about 28,000 and 98,000 cps.

5. The assembly of claim 1, wherein the two components are mixed in a ratio of 1:1 by volume.

6. The assembly of claim 1, wherein the polyurea seal has a hardness between about 40 to about 90 shore A.

7. An assembly for use in applying a seal to an aircraft first part, the assembly comprising:
   an applicator having a forcing element, a first compartment, a second compartment, and a mixing nozzle in fluid communication with the two compartments;
   wherein the first compartment includes a first component and the second compartment a second component, the two components for mixing in the mixing nozzle and capable of curing to form a polyurea seal;
   wherein the polyurea seal is thixotropic;
   wherein the first component and/or the second component includes carbon black for inhibiting the breakdown of the polyurea seal from ultraviolet radiation; and
   wherein the working life of the two component mix measured from the time of mixing is less than about 11 minutes at temperature between about 15° C. and 40° C.

8. The assembly of claim 7, wherein each of the two components before mixing, have a viscosity of between about 28,000 and 98,000 cps.

9. The assembly of claim 7, wherein the two components are mixed in a ratio of 1:1 by volume.

10. The assembly of claim 7, wherein the polyurea seal has a hardness between about 40 to about 90 shore A.

11. An assembly for use in applying a seal to an aircraft first part, the assembly comprising:
   an applicator having a forcing element, a first compartment, a second compartment, and a mixing nozzle in fluid communication with the two compartments;
      wherein the first compartment includes a first component and the second compartment a second component, the two components for mixing in the mixing nozzle and capable of curing to form a polyurea seal;

wherein the polyurea seal is thixotropic; and wherein each of the two components before mixing, have a viscosity of between about 28,000 and 98,000 cps.

12. The assembly in claim 11, wherein the first component and/or the second component includes carbon black for inhibiting the breakdown of the polyurea seal from ultraviolet radiation.

13. The assembly in claim 11, wherein the working life of the two component mix measured from the time of mixing is less than about 11 minutes at temperature between about 15° C. and 40° C.

14. The assembly in claim 11, wherein the two components are mixed in a ratio of 1:1 by volume.

15. The assembly in claim 11, wherein the polyurea seal has a hardness between about 40 to about 90 shore A.

16. A sealant for use adjacent an aircraft part, the sealant comprising:

a first uncured component; and a second uncured component;

wherein the two components, when mixed, are capable of curing to form a moisture proof polyurea seal against the aircraft surface, and when mixed, have a working life of less than about 11 minutes at between about 15° C. and 40° C.

17. A sealant for use adjacent an aircraft part, the sealant comprising:

a first uncured component; and a second uncured component;

wherein the two uncured components, when mixed, are capable of curing to form a moisture proof polyurea seal against the aircraft surface, and wherein the mix, before curing, has thixotropic properties.

18. A sealant for use adjacent an aircraft part, the sealant comprising:

a first uncured component; and a second uncured component;

wherein the two uncured components, when mixed, are capable of curing to form a moisture proof polyurea seal against the aircraft surface, and wherein the aircraft part is a windscreen.

* * * * *